US008918376B2

(12) United States Patent
Ambrosio et al.

(10) Patent No.: US 8,918,376 B2
(45) Date of Patent: Dec. 23, 2014

(54) ENERGY TRANSACTION NOTIFICATION SERVICE FOR PRESENTING CHARGING INFORMATION OF AN ELECTRIC VEHICLE

(75) Inventors: Ronald Ambrosio, Poughquag, NY (US); Erica Haefner Ferro, Boulder, CO (US); Allan James Schurr, Castle Rock, CO (US); Paul Stuart Williamson, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1513 days.

(21) Appl. No.: 12/194,210

(22) Filed: Aug. 19, 2008

(65) Prior Publication Data

US 2010/0049737 A1   Feb. 25, 2010

(51) Int. Cl.
*G06F 7/00* (2006.01)
*B60L 11/18* (2006.01)
*G07F 15/00* (2006.01)

(52) U.S. Cl.
CPC .......... *B60L 11/1824* (2013.01); *Y02T 10/7005* (2013.01); *B60L 11/1846* (2013.01); *Y04S 30/14* (2013.01); *B60L 11/184* (2013.01); *Y02T 90/163* (2013.01); *B60L 11/1838* (2013.01); *B60L 11/1848* (2013.01); *Y02T 90/14* (2013.01); *Y02T 10/7088* (2013.01); *G07F 15/005* (2013.01); *Y02T 90/128* (2013.01); *Y02T 90/169* (2013.01)
USPC ........................................................ 707/694

(58) Field of Classification Search
USPC ................................. 707/694, 613
See application file for complete search history.

(56) References Cited

U.S. PATENT DOCUMENTS

| 3,867,682 | A | 2/1975 | Yamauchi et al. |
|---|---|---|---|
| 4,306,156 | A | 12/1981 | Monaco et al. |
| 4,351,405 | A | 9/1982 | Fields et al. |
| 4,389,608 | A | 6/1983 | Dahl et al. |
| 4,433,278 | A | 2/1984 | Lowndes et al. |
| 4,532,418 | A | 7/1985 | Meese et al. |
| 5,184,058 | A | 2/1993 | Hesse et al. |

(Continued)

FOREIGN PATENT DOCUMENTS

| JP | 2000279519 A | 10/2000 |
|---|---|---|
| JP | 2000289355 A | 10/2000 |

(Continued)

OTHER PUBLICATIONS

USPTO office action for U.S. Appl. No. 12/194,290 dated Jun. 4, 2010.

(Continued)

*Primary Examiner* — Truong Vo
(74) *Attorney, Agent, or Firm* — Yee & Associates, P.C.; Parashos T. Kalaitzis

(57) ABSTRACT

A computer implemented method, apparatus, and computer usable program code for managing electric vehicle charging information. In one embodiment, the process receives charging process data. The charging process data may be stored in a data repository and associated with a user to form historical user data. The process then generates a notification in response to detecting a condition for triggering the generation of the notification. The notification comprises a set of recommendations for achieving a set of optimization objectives. In addition, the set of recommendations are derived from at least one of the historical user data and a remote data source. Thereafter, the process presents the notification to a user using a set of notification preferences.

20 Claims, 5 Drawing Sheets

(56) References Cited

U.S. PATENT DOCUMENTS

| | | | |
|---|---|---|---|
| 5,343,970 A | 9/1994 | Severinsky |
| 5,359,228 A | 10/1994 | Yoshida |
| 5,422,624 A | 6/1995 | Smith |
| 5,441,122 A | 8/1995 | Yoshida |
| 5,487,002 A | 1/1996 | Diller et al. |
| 5,492,189 A | 2/1996 | Kriegler et al. |
| 5,492,190 A | 2/1996 | Yoshida |
| 5,548,200 A | 8/1996 | Nor et al. |
| 5,563,491 A | 10/1996 | Tseng |
| 5,566,774 A | 10/1996 | Yoshida |
| 5,594,318 A | 1/1997 | Nor et al. |
| 5,627,752 A | 5/1997 | Buck et al. |
| 5,642,270 A | 6/1997 | Green et al. |
| 5,675,205 A | 10/1997 | Jacob et al. |
| 5,736,833 A | 4/1998 | Farris |
| 5,778,326 A | 7/1998 | Moroto et al. |
| 6,067,008 A | 5/2000 | Smith |
| 6,081,205 A | 6/2000 | Williams |
| 6,225,776 B1 | 5/2001 | Chai |
| 6,234,932 B1 | 5/2001 | Kuroda et al. |
| 6,252,380 B1 | 6/2001 | Koenck |
| 6,278,915 B1 | 8/2001 | Deguchi et al. |
| 6,285,931 B1 | 9/2001 | Hattori et al. |
| 6,301,531 B1 | 10/2001 | Pierro et al. |
| 6,307,349 B1 | 10/2001 | Koenck et al. |
| 6,373,380 B1 | 4/2002 | Robertson et al. |
| 6,434,465 B2 | 8/2002 | Schmitt et al. |
| 6,456,041 B1 | 9/2002 | Terada et al. |
| 6,466,658 B2 | 10/2002 | Schelberg, Jr. et al. |
| 6,480,767 B2 | 11/2002 | Yamaguchi et al. |
| 6,487,477 B1 | 11/2002 | Woestman et al. |
| 6,586,866 B1 | 7/2003 | Ikedo et al. |
| 6,609,582 B1 | 8/2003 | Botti et al. |
| 6,614,204 B2 | 9/2003 | Pellegrino et al. |
| 6,629,024 B2 | 9/2003 | Tabata et al. |
| 6,727,809 B2 | 4/2004 | Smith |
| 6,741,036 B1 | 5/2004 | Ikedo et al. |
| 6,766,949 B2 | 7/2004 | Terranova et al. |
| 6,789,733 B2 | 9/2004 | Terranova et al. |
| 6,794,849 B2 | 9/2004 | Mori et al. |
| 6,850,898 B1 | 2/2005 | Murakami et al. |
| 6,909,200 B2 | 6/2005 | Bouchon |
| 6,915,869 B2 | 7/2005 | Botti et al. |
| 7,013,205 B1 | 3/2006 | Hafner et al. |
| 7,027,890 B2 | 4/2006 | Wilson |
| 7,039,389 B2 | 5/2006 | Johnson, Jr. |
| 7,049,720 B2 | 5/2006 | Darday |
| 7,178,616 B2 | 2/2007 | Botti et al. |
| 7,216,729 B2 | 5/2007 | Syed et al. |
| 7,243,010 B2 | 7/2007 | Tabata et al. |
| 7,309,966 B2 | 12/2007 | Wobben |
| 7,402,978 B2 | 7/2008 | Pryor |
| 7,565,396 B2 | 7/2009 | Hoshina |
| 7,674,536 B2 | 3/2010 | Chipchase et al. |
| 7,693,609 B2 | 4/2010 | Kressner et al. |
| 7,698,078 B2 | 4/2010 | Kelty et al. |
| 7,740,092 B2 | 6/2010 | Bender |
| 7,885,893 B2 | 2/2011 | Alexander |
| 7,949,435 B2 | 5/2011 | Pollack et al. |
| 7,956,570 B2 | 6/2011 | Lowenthal et al. |
| 7,991,665 B2 | 8/2011 | Hafner et al. |
| 8,054,048 B2 | 11/2011 | Woody et al. |
| 8,103,386 B2 | 1/2012 | Ichikawa et al. |
| 8,103,391 B2 | 1/2012 | Ferro et al. |
| 2002/0062183 A1 | 5/2002 | Yamaguchi et al. |
| 2002/0064258 A1 | 5/2002 | Schelberg, Jr. et al. |
| 2002/0116099 A1 | 8/2002 | Tabata et al. |
| 2002/0153726 A1 | 10/2002 | Sumner |
| 2003/0137277 A1 | 7/2003 | Mori et al. |
| 2003/0153278 A1 | 8/2003 | Johnson, Jr. |
| 2003/0168263 A1 | 9/2003 | Botti et al. |
| 2003/0205619 A1 | 11/2003 | Terranova et al. |
| 2004/0046506 A1 | 3/2004 | Kawai et al. |
| 2004/0055586 A1 | 3/2004 | Botti et al. |
| 2004/0062059 A1 | 4/2004 | Cheng et al. |
| 2004/0158365 A1 | 8/2004 | Tabata et al. |
| 2004/0265671 A1 | 12/2004 | Chipchase et al. |
| 2005/0008904 A1 | 1/2005 | Suppes |
| 2005/0024189 A1 | 2/2005 | Weber |
| 2005/0044245 A1 | 2/2005 | Hoshina |
| 2005/0104465 A1 | 5/2005 | Darday |
| 2005/0231119 A1 | 10/2005 | Ito et al. |
| 2005/0234776 A1 | 10/2005 | Jacoves et al. |
| 2006/0182241 A1 | 8/2006 | Schelberg, Jr. et al. |
| 2006/0282381 A1 | 12/2006 | Ritchie |
| 2006/0287783 A1 | 12/2006 | Walker |
| 2007/0068714 A1 | 3/2007 | Bender |
| 2007/0126395 A1 | 6/2007 | Suchar |
| 2007/0282495 A1 | 12/2007 | Kempton et al. |
| 2008/0039979 A1 | 2/2008 | Bridges et al. |
| 2008/0039989 A1* | 2/2008 | Pollack et al. ............. 701/22 |
| 2008/0040223 A1 | 2/2008 | Bridges et al. |
| 2008/0040295 A1 | 2/2008 | Kaplan et al. |
| 2008/0052145 A1 | 2/2008 | Kaplan et al. |
| 2008/0086411 A1 | 4/2008 | Olson et al. |
| 2008/0097904 A1 | 4/2008 | Volchek et al. |
| 2008/0155008 A1 | 6/2008 | Stiles et al. |
| 2008/0180027 A1 | 7/2008 | Matsushita et al. |
| 2008/0228613 A1 | 9/2008 | Alexander |
| 2008/0281663 A1 | 11/2008 | Hakim et al. |
| 2008/0312782 A1 | 12/2008 | Berdichevsky et al. |
| 2009/0021213 A1 | 1/2009 | Johnson |
| 2009/0030712 A1 | 1/2009 | Bogolea et al. |
| 2009/0043519 A1 | 2/2009 | Bridges et al. |
| 2009/0066287 A1 | 3/2009 | Pollack et al. |
| 2009/0076913 A1 | 3/2009 | Morgan |
| 2009/0082957 A1 | 3/2009 | Agassi et al. |
| 2009/0091291 A1 | 4/2009 | Woody et al. |
| 2009/0092864 A1 | 4/2009 | McLean et al. |
| 2009/0144001 A1 | 6/2009 | Leonard et al. |
| 2009/0174365 A1 | 7/2009 | Lowenthal et al. |
| 2009/0177580 A1 | 7/2009 | Lowenthal et al. |
| 2009/0192655 A1 | 7/2009 | Ichikawa et al. |
| 2009/0210357 A1 | 8/2009 | Pudar et al. |
| 2009/0287578 A1 | 11/2009 | Paluszek et al. |
| 2009/0312903 A1 | 12/2009 | Hafner et al. |
| 2009/0313032 A1 | 12/2009 | Hafner et al. |
| 2009/0313033 A1 | 12/2009 | Hafner et al. |
| 2009/0313034 A1 | 12/2009 | Ferro et al. |
| 2009/0313098 A1 | 12/2009 | Hafner et al. |
| 2009/0313103 A1 | 12/2009 | Ambrosio et al. |
| 2009/0313104 A1 | 12/2009 | Hafner et al. |
| 2009/0313174 A1 | 12/2009 | Hafner et al. |
| 2010/0017045 A1 | 1/2010 | Nesler et al. |
| 2010/0049396 A1 | 2/2010 | Ferro et al. |
| 2010/0049533 A1 | 2/2010 | Ferro et al. |
| 2010/0049610 A1 | 2/2010 | Ambrosio et al. |
| 2010/0169008 A1 | 7/2010 | Niwa et al. |
| 2011/0071923 A1 | 3/2011 | Kende et al. |
| 2012/0191524 A1 | 7/2012 | Ambrosio et al. |
| 2012/0221160 A1 | 8/2012 | Hafner et al. |
| 2014/0013105 A1 | 1/2014 | Niemeyer |

FOREIGN PATENT DOCUMENTS

| | | |
|---|---|---|
| JP | 2001359203 A | 12/2001 |
| JP | 2006262570 A | 9/2006 |
| WO | 03075440 A1 | 9/2003 |
| WO | 2006057889 A2 | 6/2006 |

OTHER PUBLICATIONS

U.S. Appl. No. 12/139,562, filed Jun. 16, 2008, Hafner et al.
U.S. Appl. No. 12/139,564, filed Jun. 16, 2008, Hafner et al.
U.S. Appl. No. 12/139,565, filed Jun. 16, 2008, Hafner et al.
U.S. Appl. No. 12/139,569, filed Jun. 16, 2008, Ferro et al.
U.S. Appl. No. 12/139,571, filed Jun. 16, 2008, Hafner et al.
U.S. Appl. No. 12/194,245, filed Aug. 19, 2008, Ferro et al.
U.S. Appl. No. 12/194,325, filed Aug. 19, 2008, Ferro et al.
U.S. Appl. No. 12/194,341, filed Aug. 19, 2008, Ambrosio et al.
U.S. Appl. No. 12/139,561, filed Jun. 16, 2008, Hafner et al.
U.S. Appl. No. 12/194,290, filed Aug. 19, 2008, Ferro et al.
U.S. Appl. No. 12/139,574, filed Jun. 16, 2008, Ambrosio et al.

(56) References Cited

OTHER PUBLICATIONS

U.S. Appl. No. 12/139,575, filed Jun. 16, 2008, Hafner et al.
USPTO office action for U.S. Appl. No. 12/139,575 dated Oct. 8, 2010.
USPTO office action for U.S. Appl. No. 12/194,210 dated Nov. 22, 2010.
USPTO office action for U.S. Appl. No. 12/139,569 dated Apr. 25, 2011.
USPTO office action for U.S. Appl. No. 12/139,565 dated Jun. 1, 2011.
USPTO office action for U.S. Appl. No. 12/139,571 dated Apr. 25, 2011.
Brooks, "State Unveils Plan to Help Drivers Recharge Their Electric Vehicles", Los Angeles Times, Los Angeles CA, Aug. 29, 1998, D1.
Wildman, "Gas-Free Nation", New York Times Magazine, New York, Apr. 20, 2008, p. 69.
USPTO office action for U.S. Appl. No. 12/194,341 dated Mar. 25, 2011.
USPTO notice of allowance for U.S. Appl. No. 12/139,575 dated Mar. 8, 2011.
Office Action, dated Apr. 23, 2014, regarding U.S. Appl. No. 12/139,571, 84 pages.
Office Action, dated Aug. 5, 2014, regarding U.S. Appl. No. 12/139,571, 48 pages.
Office action dated May 26, 2010 regarding U.S. Appl. No. 12/048,183, 14 pages.
Notice of allowance dated Dec. 10, 2010 regarding U.S. Appl. No. 12/048,183, 10 pages.
Final office action, dated Nov. 29, 2010, regarding U.S. Appl. No. 12/194,290, 10 pages.
Notice of Allowance, dated Aug. 14, 2014, regarding U.S. Appl. No. 12/194,290, 7 pages.
Office Action dated Apr. 24, 2014, regarding U.S. Appl. No. 12/139,569, 80 pages.
Office Action dated Aug. 7, 2014, regarding U.S. Appl. No. 12/139,569, 54 pages.
Final office action, dated May 11, 2012 regarding U.S. Appl. No. 12/194,245, 32 pages.
Office action dated Nov. 18, 2011 regarding U.S. Appl. No. 12/194,245, 40 pages.
Notice of allowance dated Sep. 14, 2011 regarding U.S. Appl. No. 12/194,325, 7 pages.
Final office action dated Oct. 17, 2011 regarding U.S. Appl. No. 12/194,341, 15 pages.
Office action dated Jun. 20, 2011 regarding U.S. Appl. No. 12/194,325, 25 pages.
Office action dated Mar. 20, 2014, regarding U.S. Appl. No. 12/139,565, 39 pages.
Office action dated Aug. 17, 2012 regarding U.S. Appl. No. 13/431,539, 17 pages.
Final office action dated Jan. 16, 2013 regarding U.S. Appl. No. 131431,539, 11 pages.
Office action dated Jan. 7, 2011 regarding U.S. Appl. No. 12/139,561, 9 pages.
Office action dated Feb. 2, 2012 regarding U.S. Appl. No. 12/139,561, 12 pages.
Office action dated Jul. 11, 2011 regarding U.S. Appl. No. 12/139,561, 15 pages.
Office action dated Oct. 6, 2010 regarding U.S. Appl. No. 12/139,561, 10 pages.
Final office action dated Feb. 7, 2012 regarding U.S. Appl. No. 12/139,562, 47 pages.
International search report dated Jan. 3, 2007 regarding application PCT/US2005/041688, 1 page.
Office action dated Oct. 3, 2011 regarding U.S. Appl. No. 12/139,562, 65 pages.
Office action dated Jan. 5, 2012 regarding U.S. Appl. No. 12/139,564, 26 pages.
Final office action dated Oct. 26, 2011 regarding U.S. Appl. No. 12/139,565, 27 pages.
Final office action dated Apr. 23, 2014, regarding U.S. Appl. No. 12/139,565, 13 pages.
Final office action dated Oct. 19, 2011, regarding U.S. Appl. No. 12/139,569, 35 pages.
Office action dated Mar. 18, 2013, regarding U.S. Appl. No. 12/139,564, 28 pages.
Final office action dated Oct. 14, 2011 regarding U.S. Appl. No. 12/139,571, 36 pages.
Notice of allowance dated May 6, 2013, regarding U.S. Appl. No. 12/139,564, 8 pages.
Notice of allowance dated Jan. 19, 2012 regarding U.S. Appl. No. 12/139,574, 38 pages.
Notice of allowance, dated Apr. 30, 2012 regarding U.S. Appl. No. 12/139,574, 17 pages.
Office Action dated Jul. 2 2014, regarding U.S. Appl. No. 12/139,562, 110 pages.
Office action dated Aug. 16, 2005 regarding U.S. Appl. No. 10/992,840, 9 pages.
Notice of allowance dated Dec. 1, 2005 regarding U.S. Appl. No. 10/992,840, 8 pages.
Notice of allowance dated Mar. 14, 2013, regarding U.S. Appl. No. 12/139,561, 8 pages.
Ackerman, "Hybrid Vehicle Cruises for Battle," SIGNAL Magazine, Apr. 2004, 4 pages, accessed Jan. 9, 2013 http://www.afcea.org/contentflq=node/91.
Boujelelben et al., "Evaluation and optimization of a hybrid urban Microbus," IEEE Conference on Electric and Hybrid Vehicles, Dec. 2006, pp. 1-8.
"All About Plug-In Hybrids (PHEVs)," CalCars, California Car Initiative, Copyright 2012, 4 pages, accessed Jan. 9, 2013 http://www.calcars.org/vehicles.html.
Cikanek et al., "Control System and Dynamic Model Validation for a Parallel Hybrid Electric Vehicle," Proceedings of the 1999 American Control Conference, vol. 2, Jun. 1999, pp. 1222-1227.
De Breucker et al., "Grid Power Quality Improvements Using Grid-Coupled Hybrid Electric Vehicles PEMD 2006," The 3rd IET International Conference on Power Electronics, Machines and Drives, Mar. 2006, pp. 505-509.
Galdi et al., "Multi-Objective Optimization for Fuel Economy and Emissions of HEV Using the Goal-Attainment Method," EVA 18, published 2001, 12 pages.
Gonder et al., "Energy Management Strategies for Plug-In Hybrid Electric Vehicles," 2007 SAE World Congress, Apr. 2007, 13 pages.
Renault, "Kangoo reinvents the electric car," Renault press release, Mar. 2003, 3 pages.
L3 Research, Enigma Hybrid Specifications, L3 Research, Inc., copyright 2003, 1 page, accessed Jan. 9, 2013 http://www.l3research.com/vehicles/enigma/specifications.htm.
Markel et al., "Plug-in Hybrid Electric Vehicle Energy Storage System Design," Advanced Automotive Battery Conference, May 2006, 13 pages.
O'Keefe et al., "Dynamic Programming Applied to Investigate Energy Management Strategies for a Plug-in HEV,"22nd International Battery, Hybrid and Fuel Cell Electric Vehicle Symposium and Exhibit, Oct. 2006, 15 pages.
Piccolo et al., "Fuzzy Logic Based Optimal Power Flow Management in Parallel Hybrid Electric Vehicles," Iranian Journal of Electrical and Computer Engineering, vol. 4, No. 2, Summer-Fall 2005, 11 pages.
"Plug-In Hybrids," hybridcars.com, copyright 2005, 2 pages, accessed Jan. 9, 2013 http://web.archive.org/web/20050310125208/http://www.hybridcars.com.
Powers, "PHEV," About, Inc., copyright 2005, New York Times Company, 1 pages, accessed Jan. 9, 2013 http://web.archive.org/web/20051231074047/http://hybridcars.about.com.

* cited by examiner

ENERGY TRANSACTION NOTIFICATION SERVICE FOR PRESENTING CHARGING INFORMATION OF AN ELECTRIC VEHICLE

BACKGROUND OF THE INVENTION

1. Field of the Invention

The disclosure is related generally to an improved data processing system, and in particular, to a method and apparatus for managing electric vehicle charging transactions. More particularly, the present invention is directed to a computer implemented method, apparatus, and computer usable program code for presenting charge and discharge related information to a user via an energy transaction notification service.

2. Description of the Related Art

Electric vehicles (EV) can be divided into two categories: totally electric vehicles (TEV) and plug-in hybrid electric vehicles (PHEV). Plug-in hybrid electric vehicles utilize two or more power sources to drive the vehicle. With the increasing costs of fossil fuels and concern over reliance on non-renewable resources, electric vehicles are poised to become a critical component of transportation systems throughout the world. Gasoline powered vehicles utilize the explosive power of a mixture of gasoline and air to propel the vehicle. In contrast, electric vehicles rely in whole or in part on electric power to drive the vehicle.

Electric vehicles contain electric storage mechanisms, such as batteries, to store electricity until it is needed to power the electric vehicle. The electric storage mechanisms require periodic charging to replenish the electric charge for continued operation. The electricity used to charge the electric storage mechanisms may be provided by any type of on-vehicle power generation and charging mechanism. The on-vehicle power generation and charging mechanisms may include consumptive power generation systems and/or non-consumptive power generation systems, such as, without limitation, fuel cells, gasoline powered combustion engines, biodiesel powered engines, solar powered generators, and regenerative braking systems.

In totally electric vehicles and plug-in hybrid electric vehicles, charging of the electric vehicles can also be accomplished by plugging the electric vehicle into an off-vehicle charging station. The off-vehicle charging station provides an external source of electricity, such as, an electric power grid. Totally electric vehicles require this type of off-vehicle charging in all cases. Off-vehicle charging is also likely to be significantly less expensive for plug-in hybrid electric vehicles than on-vehicle charging, given currently available technology. Consequently, off-vehicle charging may be the preferred charging mode for electric vehicle owners.

The power stored in the electric storage mechanisms on the electric vehicles and on-vehicle power generation mechanisms may be used to provide electricity back to the electricity grid. For electric vehicles to be used as suppliers of electric power to an electric power grid, electric vehicles are connected to an off-vehicle infrastructure, which can efficiently consume the electricity generated or stored by the electric vehicle. To date, electric vehicle manufacturers and electric utility companies have only planned and provided infrastructure and methods for the most rudimentary charging scenario in which the electric vehicle is plugged into a common electric outlet.

BRIEF SUMMARY OF THE INVENTION

According to one embodiment, a computer implemented method, apparatus, and computer usable program code is provided generating notifications having information relating to a charging process. In one embodiment, the process receives charging process data. The charging process data may be stored in a data repository and associated with a user to form historical user data. The process then generates a notification in response to detecting a condition for triggering the generation of the notification. The notification comprises a set of recommendations for achieving a set of optimization objectives. In addition, the set of recommendations are derived from at least one of the historical user data and a remote data source. Thereafter, the process presents the notification to a user using a set of notification preferences.

DETAILED DESCRIPTION OF THE INVENTION

Figure 1:
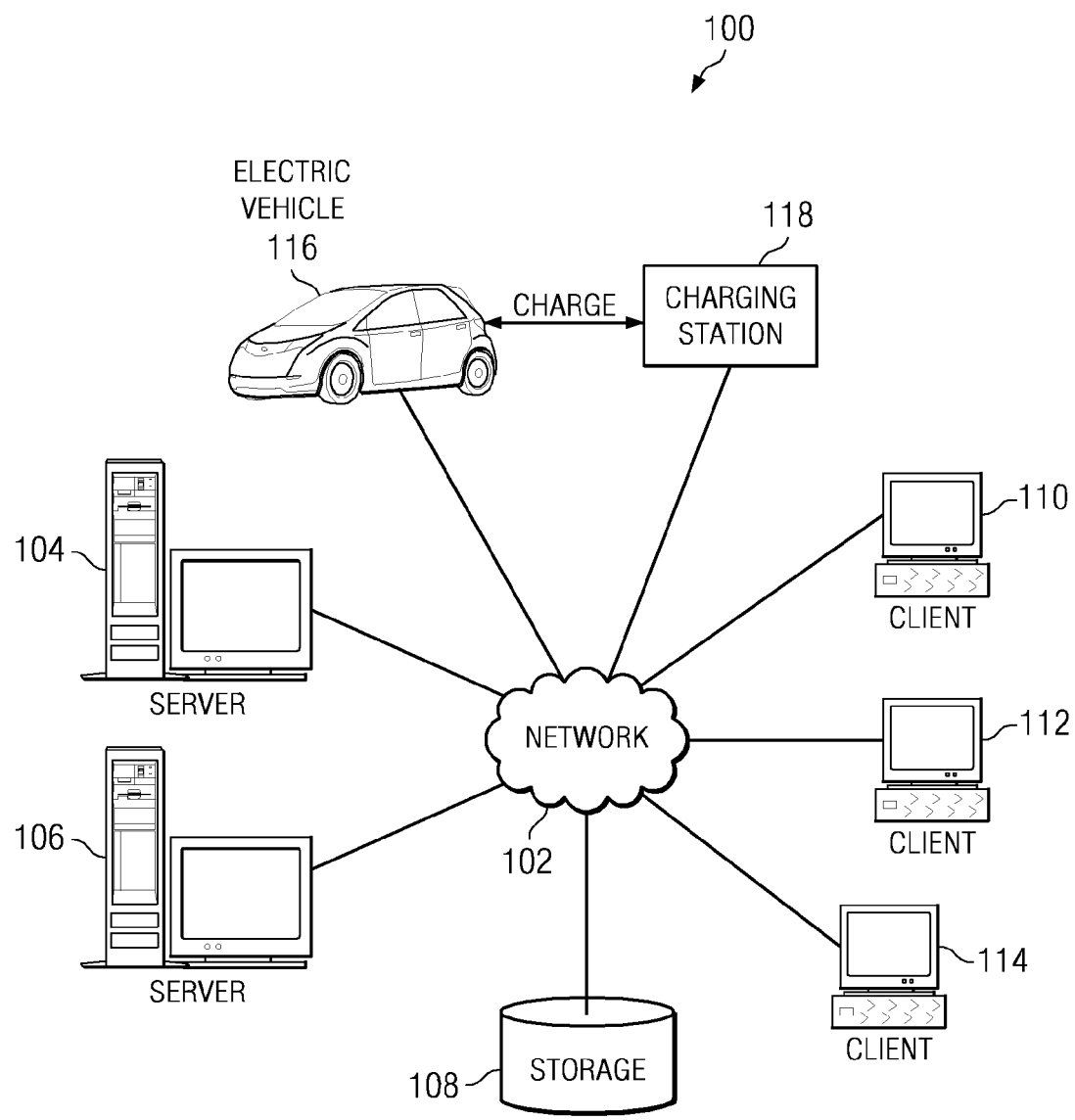
FIG. 1 is a pictorial representation of a network of data processing system in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example but not limited to, an electronic, magnetic, optical, electromagnetic, infrared, or semiconductor system, apparatus, or device. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. Note that the computer usable or computer readable medium could be electronically captured, via, for instance, optical scanning of paper or other medium, then compiled, interpreted, or otherwise processed in a suitable manner, if necessary, and then stored in a computer memory. In the context of this document, a computer usable or computer readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
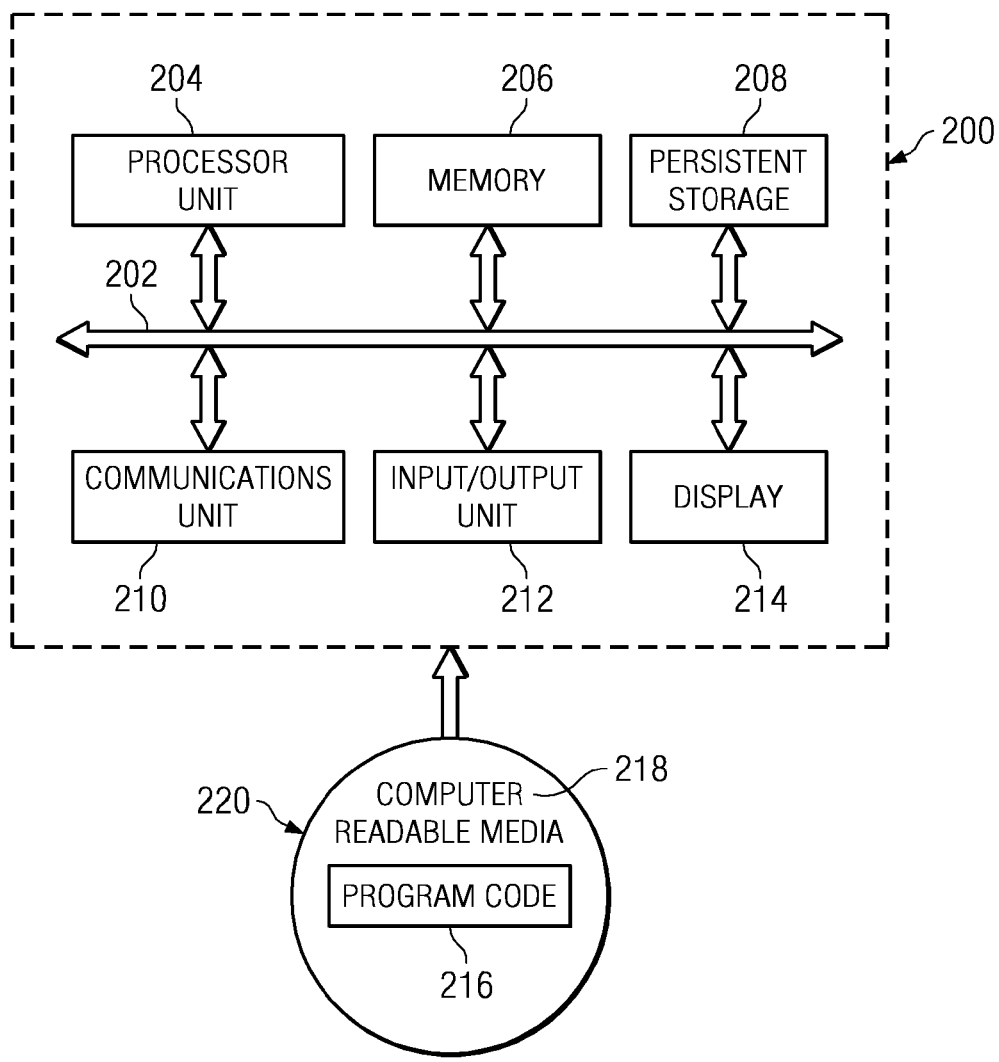
FIG. 2 is a block diagram of a data processing system in which illustrative embodiments may be implemented.

With reference now to the figures, and in particular, with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing system in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Electric vehicle 116 is any vehicle that utilizes electric power, in whole or in part, to drive the vehicle that is capable of being plugged into charging station 118. Electric vehicle 116 may be a totally electric vehicle or a plug-in hybrid electric vehicle. The plug-in electric hybrid vehicle may be a gasoline/electric hybrid, a natural gas/electric hybrid, a diesel/electric hybrid, a biodiesel/electric hybrid, or any other type of plug-in electric hybrid. Electric vehicle 116 may optionally include an on-vehicle power generation mechanism, such as, but without limitation, solar power electric generators, gasoline powered electric generators, biodiesel powered electric generator, or any other type of on-vehicle electric power generation mechanism.

Charging station 118 is any station, kiosk, garage, power outlet, or other facility for providing electricity to electric vehicle 116. Electric vehicle 116 receives electricity from, or provides electricity to, an electric grid at charging station 118. Charging station 118 is a selected charge/discharge site, such as an outlet or kiosk, for providing electric vehicle 116 with access to the electric grid. For example, and without limitation, charging station 118 may be a power outlet in a privately owned garage, an electric outlet in a docking station in a commercially owned electric vehicle charging kiosk, or a power outlet in a commercially owned garage.

Electric vehicle 116 connects to charging station 118 via an electrical outlet or other electricity transfer mechanism. The electricity may also be optionally transferred via wireless energy transfer, also referred to as wireless power transfer, in which electrical energy is transferred to a load, such as electric vehicle 116, without interconnecting wires. The electricity may flow from charging station 118 into electric vehicle to charge electric vehicle 116. The electricity may also flow from electric vehicle 116 into charging station 118. The electricity transferred to charging station 118 may be sold back to the power grid. Alternatively, the electricity may be stored for local use. For example, electricity returned to charging station 118 may be used for powering electrical components of charging station 118, or for other local electrical loads within the premises. Alternatively, the electricity may be stored and provided to another electric vehicle charging at a nearby charging station.

Electric vehicle 116 and charging station 118 are optionally connected to network 102. Electric vehicle 116 and charging station 118 send and receive data associated with the charging of electric vehicle, the capabilities of electric vehicle, the capabilities of charging station 118, the current charge stored in electric vehicle, the rate of charging electric vehicle, the price of electricity received from a power grid, identity of the owner and/or operator of electric vehicle 116 and/or any other data relevant to charging or de-charging electric vehicle 116 over network 102.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. Data processing system 200 may also be implemented as a computing device on-board an electric vehicle, such as electric vehicle 116 in FIG. 1.

In this illustrative example, data processing system 200 includes communications fabric 202, which provides communications between processor unit 204, memory 206, persistent storage 208, communications unit 210, input/output (I/O) unit 212, and display 214. Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. In another example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Currently, electric vehicle manufacturers and electric utility companies have only planned and provided infrastructure for the most rudimentary charging scenarios, such as, merely plugging the electric vehicle into a common electric outlet that is owned by the owner and operator of the electric vehicle. The illustrative embodiments recognize that charging electric vehicles will frequently be conducted under much broader and more complex sets of circumstances than this simple scenario and infrastructure is needed to accommodate these complex transactions. For example, owners and operators of electric vehicles will frequently be required to charge their electric vehicle at a charging station that is remote from the home of the electric vehicle owner. In most circumstances, it is unlikely that the electric vehicle owner will own the off-vehicle charging stations from which the owner obtains electricity to recharge the electric vehicle. In such a situation, the owner or operator of the electric vehicle will likely be required to pay for the charge obtained from the off-vehicle charging station.

The illustrative embodiments recognize that the charging transactions by which electric vehicles obtain electricity from an off-vehicle charging station to charge the electric vehicle requires a much more complete, flexible, and interoperable system governing all aspects of the charging transaction. Electric vehicle charging transactions can be divided into the pre-charge phase, the charge phase, and the post-charge phase. During the pre-charge phase of decision enablement, all parties are presented with the conditions governing the charging transaction. Electricity flows to the electric vehicle and payment is made during the post-charge phase. Finally, during the post-charge phase of the transaction, an analysis is performed to provide incentives and induce specific behaviors on the part of any party involved in the transaction. Additional charging infrastructure may also be provided to meter electricity at the point of charge, identify the various parties involved in the transaction, and provide flexible business rules governing the flow of funds between those parties.

Figure 3:
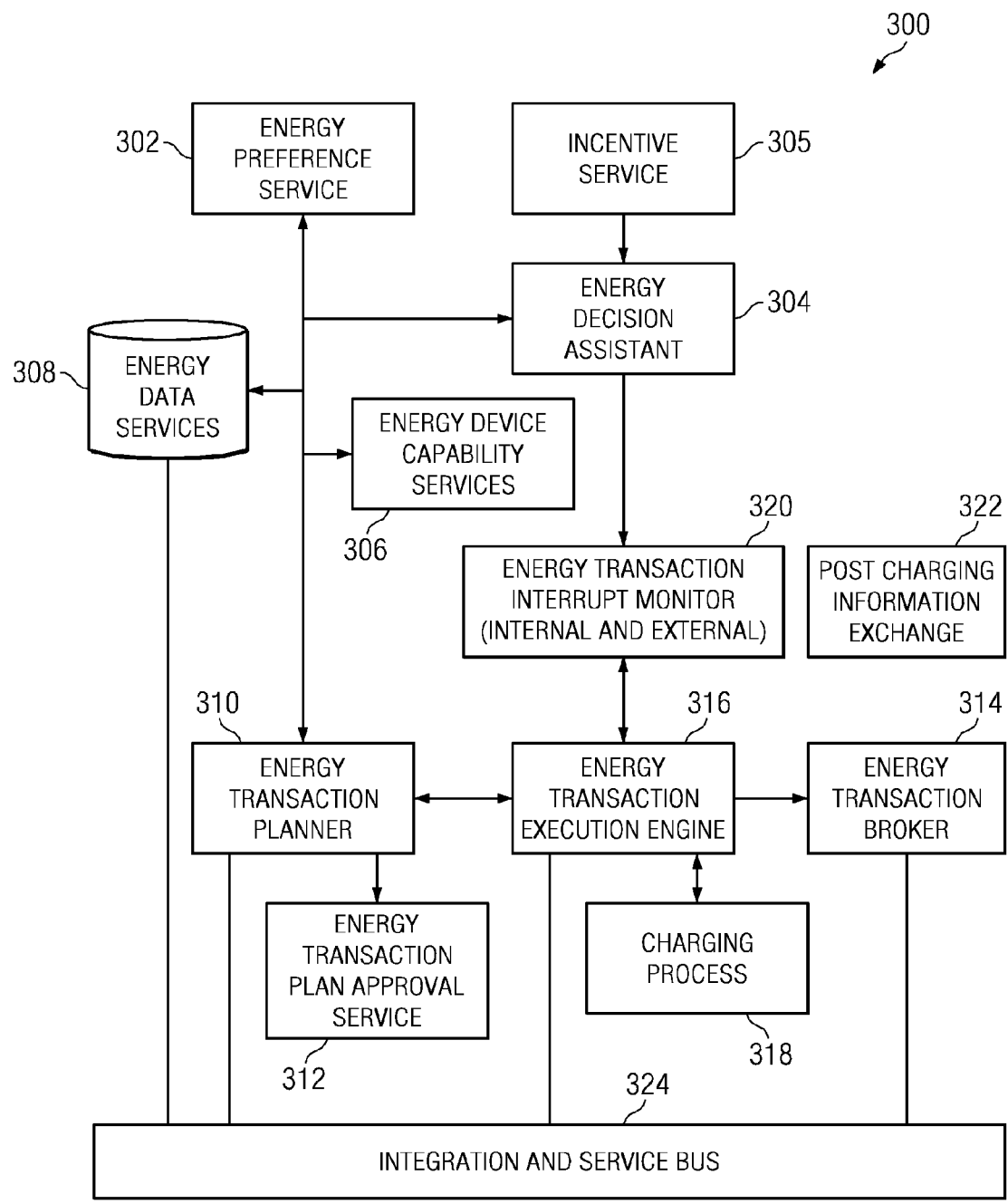
FIG. 3 is a block diagram of an energy transaction infrastructure in accordance with an illustrative embodiment.

FIG. 3 is a block diagram of an energy transaction infrastructure in accordance with an illustrative embodiment. Electric vehicle energy transaction infrastructure 300 is a charging infrastructure for managing all phases of an electric vehicle charging transaction. During the pre-charge phase, all parties of the transaction are presented with the conditions governing the charging transaction. The parties may include, without limitation, the owner of the electric vehicle to be charged, the operator of the electric vehicle, the owner of the charging station, and an electric utility company providing electricity to an electric power grid associated with the charging station. Parties agree to conditions relevant to their role in the transaction prior to the charge commencing. There are likely to be many special circumstances in the terms and conditions, which are presented in standard formats which are universally understood and which can be readily communicated and agreed upon by all parties.

During the pre-charge phase, electric vehicle energy transaction infrastructure 300 utilizes energy preference service 302, energy decision assistant 304, energy device capability services 306, energy data services 308, energy transaction planner 310, and optionally, energy transaction plan approval service 312 to generate a plan governing the charging transaction to the parties involved in the transaction.

Energy preference service 302 is a software component that generates, stores, and retrieves preference information associated with an electric vehicle and the preference information associated with the parties to the transaction. Preferences may include, without limitation, a maximum price per kilowatt hour of electricity to be paid by a party, a location where charging may occur, a location where charging may not occur, a rate of charging the electric vehicle, a minimum amount of charge, or any other preferences associated with charging an electric vehicle. The preferences may be pre-generated by one or more of the parties to the transaction.

Energy decision assistant 304 is an optional service that provides real-time options and trade-offs for a particular trip. For example, energy decision assistant 304 may monitor available incentives, weather conditions, a travel route, traffic information, and other real-time data to identify the best electric vehicle charging options for a particular trip.

Incentive service 305 receives offers of incentives from third party vendors. The incentives may be offers of discounts, rebates, rewards, and/or other incentives associated with charging an electric vehicle to encourage an operator of the electric vehicle to perform one or more behaviors associated with charging the electric vehicle. For example, and without limitation, an incentive may offer to charge the electric vehicle for free at a particular charging station if the owner or operator of the electric vehicle purchases one or more products from the third party vendor. Incentive service 305 provides information describing current incentives to energy transaction planner 310. In one embodiment, incentive service 305 provides the information describing the incentives to energy decision assistant 304. Energy decision assistant 304 then provides the incentives information to energy transaction planner 310.

Energy device capability services 306 is a software component that identifies and validates device capabilities. For example, and without limitation, energy device capability services 306 may include information describing the charging capabilities of the charging station, the charging requirements of the electric vehicle, the maximum storage capacity of the electric vehicle's on-vehicle storage mechanisms, the existing amount of charge in the electric vehicle, the number of amps of electricity the charging station is capable of providing, and any other information associated with the capabilities and requirements of the electric vehicles and the charging station.

Energy data services 308 are a set of one or more third party data sources providing information relevant to the energy transaction. Energy data services 308 may include, without limitation, weather information sources, traffic information sources, map and travel information sources, charging station price information sources, or any other third party information sources.

Energy transaction planner 310 is an application that creates a transaction plan for governing the electric vehicle charging transaction based on preferences of one or more principals. Energy transaction plan approval service 312 approves the transaction plan and validates with energy transaction broker 314. Energy transaction plan approval service 312 may be required to notify one or more parties of the terms of the transaction and obtain approval of one or more of the terms from the party. For example, and without limitation, if an operator of the electric vehicle is not the owner of the electric vehicle, energy transaction plan approval service 312 may require approval from the owner of the vehicle before allowing the vehicle to receive power at a charging station if the charging station and/or a utility will charge the owner of the electric vehicle a fee for the charging transaction.

In this example, the charging phase begins when energy transaction execution engine 316 sends the transaction plan generated by energy transaction planner 310 for approval by energy transaction plan approval service 312, initiates the request to begin charging the electric vehicle, monitors and logs the health and safety of charging process 318, and receives requests from energy transaction interrupt monitor 320. During charging process 318, electricity flows into the electric vehicle or out of the electric vehicle and back into the power grid. Energy transaction interrupt monitor 320 monitors data transmissions to detect interrupt conditions that may terminate the flow of electric power to or from a vehicle. The interrupts may originate from the power grid, suppliers, and/or vehicles. For example, if a price of energy exceeds a predefined threshold in violation of a user-selected preference, energy transaction interrupt monitor 320 detects this interrupt condition and initiates appropriate actions to handle the cessation of electric power flow to the electric vehicle.

Energy transaction broker 314 supports settling an electric vehicle charging and discharge transaction independent of electricity supplier, parking space supplier, electrical infrastructure supplier, taxing authority, incentive provider, or other interested party. Elements include pricing schedules, time based pricing, facility recovery, tax collection, incentives, and/or fixed plans. Energy transaction broker 314 may also be used by energy transaction plan approval service 312 to validate the financial elements of the energy transaction plan prior to plan approval and prior to charging the electric vehicle.

The post-charge phase comprises analysis of the completed energy transaction to provide incentives, redeem credits or benefits, and induce specific behaviors by one or more parties involved in the charging transaction. The post-charge phase also includes payment of the appropriate parties for the energy transaction in accordance with the energy transaction plan governing the transaction. Various programs may be available to incent specific behaviors on the part of consumers. For example, a vehicle owner or user may receive reduced electricity rates if vehicle charging is conducted during off-peak times, such as during the night rather than during daylight hours when electricity usage is higher. Post charging information exchange 322 accumulates data pertinent to these incentives or redemption programs, authenticates the incentives data, and analyzes the incentives data to identify the most effective business process and optimize incentives for the parties.

Operational and financial parameters are conveyed for an optimum charge to occur. For example, a dynamic representation of an electric vehicle capability to consume charge should be understood at all times during the charging process to ensure the vehicle is not damaged or that the protections of the charging system are preserved. Electricity metering of the power flow may also be conducted and reported. Standards representing the acceptable charging voltage and amperage ranges, for example may be communicated and maintained for a safe charging transaction to occur. All data pertinent to the financial transaction is conveyed and recorded.

The components shown in FIG. 3 may be implemented on a data processing system associated with an electric vehicle. In such case, the components communicate and transfer data using integration and service bus 324. Integration and service bus 324 is an internal communication system within the electric vehicle, such as any wired or wireless communications system. A wired communications system includes, without limitation, a data bus, or a universal serial bus (USB). If one or more components shown in FIG. 3 are located remotely, the components may transfer data using any type of wired or wireless network connection to connect to a network, such as network 102 in FIG. 1. A wireless network connection may be implemented over a cell-phone network, satellite, two-way radio, WiFi networks, or any other type of wireless network.

The information generated during the charging process of an electric vehicle may be collected, analyzed, and distributed to a user of the electric vehicle. The user may be the owner or operator of the electric vehicle. The information may then be used to generate recommendations for optimizing energy consumption. In addition, the information may be used for auditing purposes. The information may be formatted and presented using a notification application or notification device selected by the user.

It will be appreciated by one skilled in the art that the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

According to one embodiment, a computer implemented method, apparatus, and computer usable program code is provided for managing charging information of an electric vehicle. In one embodiment, the process receives charging process data. The charging process data may be stored in a data repository and associated with a user to form historical user data. The process then generates a notification in response to detecting a condition for triggering the generation of the notification. The notification comprises a set of recommendations for achieving a set of optimization objectives. In addition, the set of recommendations are derived from at least one of the historical user data and a remote data source. Thereafter, the process presents the notification to a user using a set of notification preferences.

Figure 4:
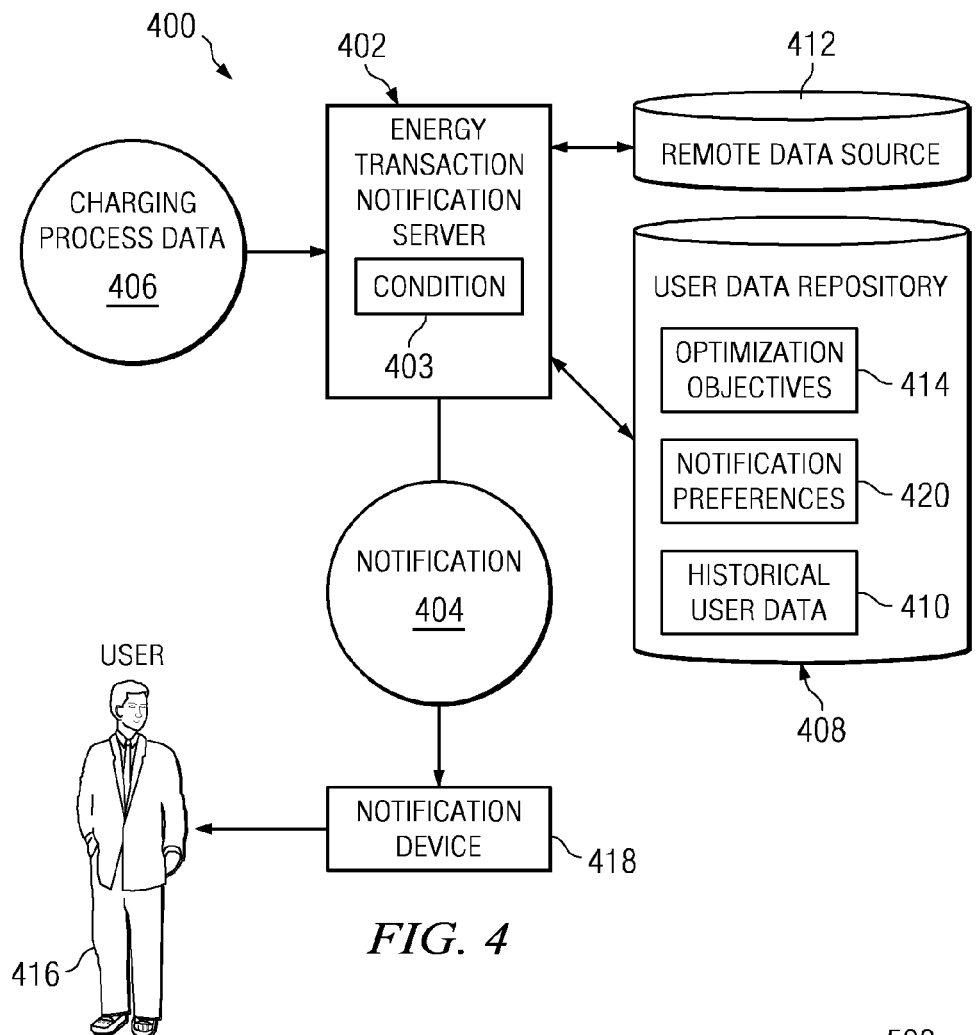
FIG. 4 is a block diagram of a data processing system for managing the distribution of information through an electric vehicle charging infrastructure in accordance with an illustrative embodiment.

FIG. 4 is a block diagram of a data processing system for managing the distribution of information through an electric vehicle charging infrastructure in accordance with an illustrative embodiment. Data processing system 400 is a data processing system, such as network data processing system 100 in FIG. 1.

Data processing system 400 includes energy transaction notification service 402. Energy transaction notification service 402 is a software application providing data aggregation, analysis, and distribution services. In particular, energy transaction notification service 402 is a software application configured for providing information related to a charging process. A charging process is the transfer of electricity between an electric vehicle and a charging station. In particular, energy transaction notification service 402 generates notification 404 for presentation to a selected recipient. Notification 404 is a message providing information of charge and discharge related events. For example, notification 404 may include time and date of a charge or discharge of electricity, charging requirements based on a calendared schedule, results of analysis, or other types information that may be collected or derived from a charging process.

The information included in notification 404 is derived from charging process data 406. Charging process data 406 is data derived, at least in part, from a charging process, such as charging process 318 in FIG. 3. Charging process data 406 includes information describing details of the charging process, such as, for example, travel information, vehicle information, user information, or charging information. Travel information is information that relates to driving and operation of an electric vehicle, such as electric vehicle 116 in FIG. 1. Travel information may include, for example, identification of roadways on which the electric vehicle has traveled, distances traveled, charging locations visited, speeds attained, or other of information that may be derived from the movement of the electric vehicle from one location to another. In addition, travel information may also include the identification of prospective roadways that will be traveled upon for a current trip. The prospective roadways may be identified from a vehicle Global Positioning Satellite navigation system.

Vehicle information is information that relates to the status and maintenance of the electric vehicle. For example, vehicle information may include battery capacity, tire pressure, engine efficiency, fuel efficiency for gas-electric hybrid vehicles, potential maintenance issues, or any other information relating to the condition of the electric vehicle.

Charging information is information relating to the charging of the electric vehicle. Charging information may include, for example, data related to the time and length of charge periods, amount of electricity received from or transmitted to a power grid, utility companies from which the electricity originated, or any other information relating to the transmission of electricity between a charging station and the electric vehicle.

Charging process data 406 may be received from an energy transaction broker, such as energy transaction broker 314 in FIG. 3. However, in other embodiments, charging process data 406 may originate from another source, such as electric vehicle 116 and/or charging station 118 in FIG. 1, energy transaction execution engine 316 in FIG. 3, or another component of electric vehicle energy transaction infrastructure 300 in FIG. 3.

Charging process data 406 is associated with an individual user. For example, charging process data 406 may include data collected from a user's operation of an electric vehicle. Consequently, energy transaction notification service 402 may store charging process data 406 in user data repository 408. User data repository 408 is a data storage device. For example, user data repository 408 may be a data server, hard drive, flash drive, or any other currently available or later developed storage device. Charging process data 406 may be stored in user data repository 408 as historical user data 410. Historical user data 410 is charging process data that has been collected over time. From historical user data 410, energy transaction notification service 402 may identify, for example, patterns of vehicle operation that may be used for optimizing a user's energy consumption.

Energy transaction notification service 402 may also include in notification 404 information provided by remote data source 412. Remote data source 412 is a source of data other than data derived from a charging process. Remote data source 412 may be, for example, a remote server providing energy transaction notification service 402 with updated information on the cost of electricity, data processing algorithms for processing data for inclusion into notification 404, remote databases storing aggregated data, or any other category or type of information that may be relevant for presentation to a recipient via notification 404.

Notification 404 may include a set of recommendations for optimizing energy consumption, reducing an amount of money paid for energy purchase, or maximizing an amount of credits or benefits from third party principals participating in the charging process settlement value chain. Energy consumption may be optimized by abiding by a set of predefined rules. The rules may be set forth in optimization objectives 414. Optimization objectives 414 are rules for achieving a predefined goal. The goals are selected by an owner or operator of an electric vehicle, such as user 416. The goals may specify, for example, an amount of energy that may be used in a particular amount of time or the amount of money that may be spent on charging at a given time. Optimization objectives 414 provide energy transaction notification service 402 instructions on how to calculate, manipulate, and/or determine the set of recommendations for inclusion into notification 404. For example, user 416 may specify an optimization objective for decreasing an amount of money spent on the net receipt of energy from a charging transaction. In other words, the optimization objective may provide a recommendation to user 416 presenting various options that may be selected for attaining the objective. For example, energy transaction notification service 402 may recommend a location for user 416 to charge the vehicle, which results in the least amount of money paid by user 416. Energy transaction notification service 402 may identify this location by taking into account the cost of electricity and the cost of parking an electric vehicle in a parking spot during the charging process. In addition, energy transaction notification service 402 may also factor in the times of day where charging should occur, or the credits, benefits, or incentives that may offset the cost of electricity.

According to an illustrative embodiment, energy transaction notification service 402 can process historical user data 410 and/or remote data source 412 according to optimization objectives 414. The processing of historical user data 410 and/or remote data source 412 identifies selected data 415. Selected data 415 is data that may be relevant to achieve optimization objectives 414. In one example, optimization objectives 414 may be created to minimize non-electric propulsion in a hybrid electric vehicle. As such, optimization objectives 414 may specify a set of algorithms to mine or identify selected data 415 to derive the optimal electric vehicle operation characteristics for achieving objectives, such as the minimization of the non-electric propulsion. The characteristics may include a rate of acceleration and deceleration, or types of traffic patterns to avoid, such as high-speed highway driving. Energy transaction notification service 402 can then notify user 416 with information included in notification 404 about how to operate the electric vehicle to achieve optimization objectives 414. Optionally, notification 404 may include alerts to inform user 416 when the electric vehicle is not being operated as recommended.

Energy transaction notification service 402 presents notification 404 to user 416. User 416 is one or more owners and/or operators of an electric vehicle, such as electric vehicle 116 in FIG. 1. Notification 404 may be presented to user 416 on notification device 418. Notification device 418 is any device capable of providing user 416 with notification 404. Thus, if notification 404 includes audio and visual information, then notification device 418 may include at least one of a computer, smart phone, cell phone, personal digital assistant, touchscreen device integrated into the dashboard of an electric vehicle, or any other device. In other words, notification device 418 may include any of a computer, a smart phone, a cell phone, a personal digital assistant, a touchscreen device integrated into the dashboard of an electric vehicle, or any combination thereof.

Notification device 418 may host any currently available or later developed software application for facilitating the presentation of notification 404 to user 416. For example, notification 404 may be presented to user 416 via a calendaring application hosted on notification device 418. The calendaring application may be, for example, Lotus Notes™ or Outlook™. Lotus Notes™ is available from International Business Solutions Software Group. Outlook™ is available from Microsoft Corporation. Thus, energy transaction notification service 402 may format notification 404 as a calendar entry for subsequent review.

In another embodiment, notification device 418 may be a cell phone. Consequently, energy transaction notification service 402 may configure notification 404 as a text message for presentation to user 416. Alternatively, energy transaction notification service 402 may configure notification 404 as an audio-based message to which user 416 may listen on notification device 418. In other embodiments, notification 404 may be a pager message delivered to a pager. Notification 404 may be any form of notification for receipt by a user on a communications device.

In yet another embodiment, notification 404 may be an event message sent to a software application for further processing. For example, notification 404 may be delivered to a money management application. The money management application may then perform specified actions in response to receiving notification 404, such as updating a monthly expense sheet with information contained in notification 404.

Users may configure the manner in which notification 404 are presented by selecting notification preferences 420. Notification preferences 420 are preferences selected by a user for governing the presentation of notification 404 to user 416. For example, notification preferences 420 may dictate the manner in which information is presented in notification 404, the devices to which notification 404 are presented, the time of day in which notification 404 is transmitted to user 416, the categories of information provided within notification 404, or any other option that may be selected by user 416.

In accordance with an illustrative embodiment, user 416 selects optimization objectives 414. Optimization objectives 414 may be selected from a list of objectives. Thereafter, user 416 selects one or more options to form notification preferences 420. Notification preferences 420 dictate the details of how and when notification 404 is presented to user 416 and what information is included within notification 404.

Energy transaction notification service 402 generates notification 404 in response to detecting condition 403 for triggering the generation of notification 404. Condition 403 is an event or circumstance that triggers the generation of notification 404. Condition 403 may be, for example, a detection of newly generated charging process data 406 from a recently completed charging process. Alternatively, condition 403 may be a specific date, or a projected cost of a charging process exceeding a predefined threshold. In one example, the projected cost of the charging process may be calculated based upon a pattern of charging based on data mined from historical user data 410 and paired with an energy cost obtained form remote data source 412.

Once condition 403 is detected, energy transaction notification service 402 identifies the sources of data from which notification 404 is generated. The sources of data may include, for example, charging process data 406, remote data source 412, or historical user data 410. The sources of data may be identified based upon the type of data required for generating notification 404. For example, if notification 404 includes an analysis of past charging processes, then energy transaction notification service 402 identifies historical user data 410 as a data source for use in generating notification 404.

Alternatively, energy transaction notification service 402 may identify sources of data necessary for generating notification 404 by referencing notification preferences 420. Notification preferences 420 may specify categories of information, such as historical user data 410, for inclusion in notification 404. After the sources of data for generating notification 404 has been identified, energy transaction notification service 402 references optimization objectives 414 for processing the sources of data for generating a set of recommendations. Once notification 404 is generated, energy transaction notification service 402 transmits notification 404 to user 416 using notification preferences 420.

Figure 5:
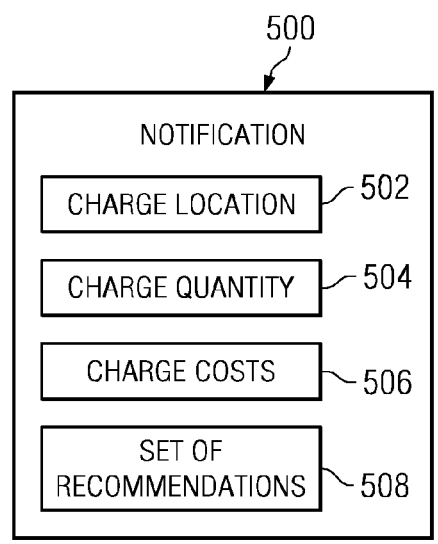
FIG. 5 is a block diagram of a notification for presentation to a user in accordance with an illustrative embodiment.

FIG. 5 is a block diagram of a notification for presentation to a user in accordance with an illustrative embodiment. Notification 500 is a notification, such as notification 404 in FIG. 4.

Notification 500 presents information to a recipient, such as user 416 in FIG. 4. The recipient of notification 500 may use the information included therein for such reasons as to audit charging process, optimize the use of an electric vehicle, optimize energy consumption, reduce an amount of money spent on charging the electric vehicle, or performance of any other action that may be directly or indirectly related to the charging process.

Notification 500 may include any category of information that may be extracted from the charging process data, such as charging process data 406 in FIG. 4. For example, notification 500 may include information relating to trip information, vehicle information, or charging information. In addition, notification 500 may also include data that may be derived from a remote data source, such as remote data source 412 in FIG. 4. In the illustrative example in FIG. 5, notification 500 includes charge location 502. Charge location 502 is data describing locations at which an electric vehicle owned or operated by a user has engaged in a charging process.

In addition, notification 500 may also include charge quantity 504. Charge quantity 504 is data describing an amount of electricity transmitted between an electric vehicle and a charging station. Thus, charge quantity 504 may indicate an amount of electricity received by an electric vehicle for recharging the battery of the electrical vehicle. In addition, charge quantity 504 may indicate an amount of electricity transmitted to a power grid from the electric vehicle. The amount of energy transmitted to and from the electric vehicle will both be collected, since the cost of energy may be priced differently for a purchase of electricity than for a sale of electricity, even if the purchase and sale occur in the same charging process. For example, if an electric vehicle receives electricity from a charging station, the purchase price of that electricity may differ than the sale price of electricity transmitted to the charging station even if the purchase and sale occur in the same charging process. In addition, the user may be entitled to money, credits, benefits, or other forms of incentives based upon the amount of electricity provided to the power grid.

Charge costs 506 is data that informs a recipient of notification 500 of the per unit cost of electricity and/or the total cost of a charging process based on the amount of electricity transferred as indicated in charge quantity 504. For example, charge costs 506 may inform the recipient of notification 500 of the price of electricity per kilowatt hour and the total cost of a charging process based on that price.

Notification 500 may also include set of recommendations 508. Set of recommendations 508 is data that provides instruction to the recipient of notification 500 to achieve one or more optimization objectives, such as optimization objectives 414 in FIG. 4. For example, a user of an electric vehicle may select an optimization objective for reducing an overall cost of recharging an electric vehicle. Consequently, an energy transaction notification service may provide set of recommendations 508 that list charging stations having the cheapest parking fee based upon a time of day that the user typically recharges the electric vehicle. In addition, set of recommendations 508 may specify, for example, particular utility companies offering the least expensive electricity.

Notification 500 may be generated by mining available data, such as historical user data 410 in FIG. 4, or data available from a remote data source, such as remote data source 412 in FIG. 4. Other categories of information may be presented in notification 500 in addition to, or in place of the data shown in notification 500 in FIG. 5. In addition, the data may be formatted in a manner as selected by a user. For example, notification 500 may present information as plain text in a text message. However, in alternate embodiments, notification 500 may be configured as an entry in a calendaring application, as an audio recording for access via cell phone, or any other format specified by the recipient. In addition, the notification may be sent to a software application for further processing. For example, notification 500 may be delivered to a money management application. The money management application may then perform specified actions in response to receiving notification 500, such as updating a monthly expense sheet with information contained in notification 500.

Figure 6:
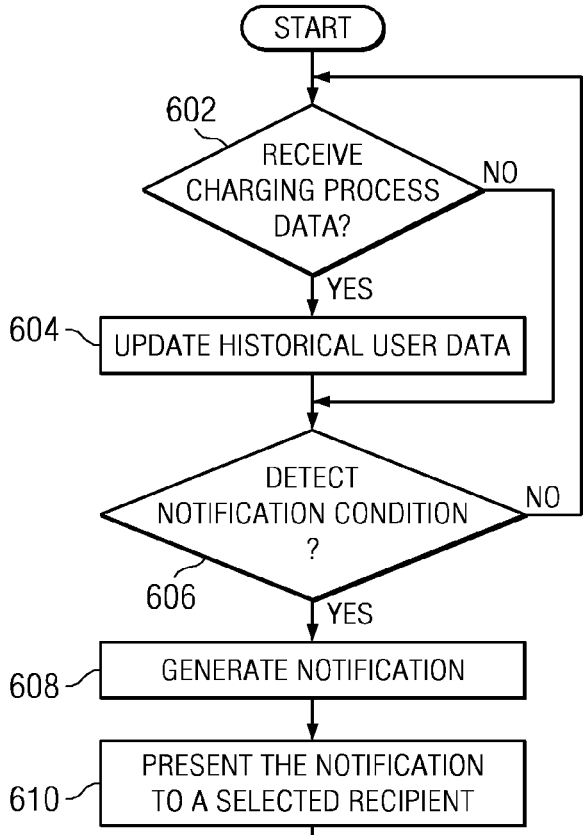
FIG. 6 is a flowchart of a process for presenting notifications related to a charging process in accordance with an illustrative embodiment.

FIG. 6 is a flowchart of a process presenting notifications related to a charging process in accordance with an illustrative embodiment. The process in FIG. 6 may be implemented by a software component, such as energy transaction notification service 402 in FIG. 4.

The process begins by making the determination as to whether charging process data has been received (step 602). Charging process data is charging process data, such as charging process data 406 in FIG. 4. Charging process data is generated by components of an electric vehicle energy transaction infrastructure, such as electric vehicle energy transaction infrastructure 300 in FIG. 3. If the process makes the determination that charging process data has been received, then the process updates historical user data (step 604).

The process then makes the determination as to whether any notification conditions have been detected (step 606). If notification conditions have not been detected, then the process returns to step 602. However, if notification conditions have been detected, then the process generates the notifications (step 608). Thereafter, the process presents the notifications to any selected recipients (step 610) and terminates. The selected recipients may include a user, such as user 416 in FIG. 4.

Returning now to step 602, if the process makes the determination that charging process data has not been received, then the process proceeds to step 606.

Figure 7:
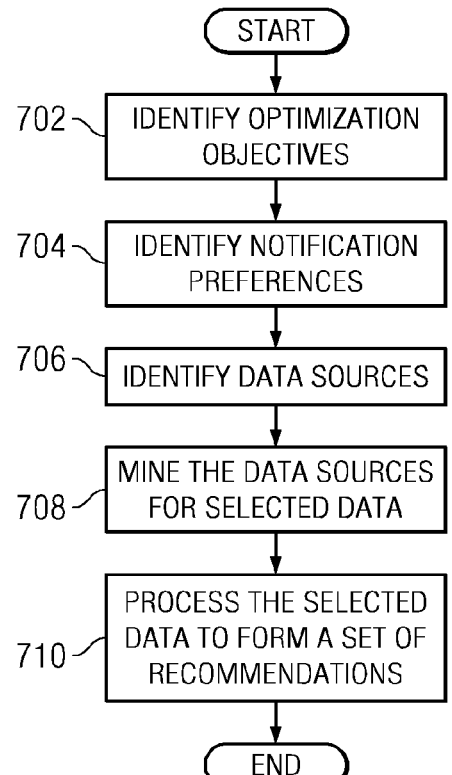
FIG. 7 is a flowchart of a process for generating a set of recommendations for optimization of electric vehicle operation accordance with an illustrative embodiment.

FIG. 7 is a flowchart of a process for generating a set of recommendations for optimization of electric vehicle operation in accordance with an illustrative embodiment. The process may be implemented by a software component, such as energy transaction notification service 402 in FIG. 4.

The process begins by identifying optimization objectives (step 702). The process then identifies notification preferences (step 704). Thereafter, the process identifies data sources necessary for generating the notification (step 706). The process may identify the data sources using at least one of optimization objectives and a set of notification preferences. As used herein the phrase "at least one of" when used with a list of items means that different combinations of one or more of the items may be used and only one of each item in the list may be needed. For example, "at least one of item A, item B, and item C" may include, for example, without limitation, item A or item A and item B. This example also may include item A, item B, and item C or item B and item C. Thus, the data sources may be identified using either the optimization objectives, the set of notification preferences, or both.

Once the data sources have been identified, the process then mines the data sources for selected data (step 708). In one embodiment, the optimization objectives identify the selected data for inclusion in the notification. Thereafter, the selected data is processed to form a set of recommendations (step 710) and the process terminates. The selected data is processed to achieve the objectives specified in optimization objectives, such as optimization objectives 414 in FIG. 4.

According to one embodiment, a computer implemented method, apparatus, and computer usable program code is provided for generating notifications having information relating to a charging process in accordance with an illustrative embodiment. In one embodiment, the process receives charging process data. The charging process data may be stored in a data repository and associated with a user to form historical user data. The process then generates a notification in response to detecting a condition for triggering the generation of the notification. The notification comprises a set of recommendations for achieving a set of optimization objectives. In addition, the set of recommendations are derived from at least one of the historical user data and a remote data source. Thereafter, the process presents the notification to a user using a set of notification preferences.

The energy transaction notification service enables the generation of notifications having information relating to a charging process. The illustrative embodiments show how data derived from the operation of the electric vehicle is aggregated, processed, and distributed after a charging period transaction has been completed. User data can be aggregated over time and processed. Once processed, the user data may be incorporated into a notification that is then transmitted to a user according to the user's notification preferences. The notification may enable the recipient of the notification to audit the charging process. In addition, the notification may include a set of recommendations for optimizing one or more aspects of the operation of an electric vehicle. In this manner, the energy transaction notification service simplifies the distribution of information to users of an electric vehicle.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of managing transaction notifications of an electric vehicle charging process, the computer implemented method comprising:
   receiving charging process data, wherein the charging process data is stored in a data repository and associated with a user to form historical user data;
   responsive to detecting a condition for triggering a generation of a notification, generating the notification, wherein the notification comprises a set of recommendations for achieving a set of optimization objectives, and wherein the set of recommendations are derived from at least one of the historical user data and a remote data source; and
   presenting the notification to the user according to the set of notification preferences.

2. The computer implemented method of claim 1, wherein generating the notification further comprises:
   mining the at least one of the historical user data and the remote data source for selected data; and
   processing the selected data to form the set of recommendations, wherein the set of recommendations provide instructions for achieving the set of optimization objectives for optimizing energy consumption.

3. The computer implemented method of claim 1, wherein the presenting step further comprises:
   presenting the notification to a user on a notification device, wherein the notification device comprises at least one of a smart phone, a computer, and a display device of an electric vehicle.

4. The computer implemented method of claim 1, wherein presenting the notification further comprises:
   formatting the notification according to the set of notification preferences.

5. The computer implemented method of claim 4, wherein presenting the notification further comprises:
   formatting the notification as an entry in a calendaring application.

6. The computer implemented method of claim 4, wherein the notification is at least one of an event message to a computer program, a text message, a pager message, and an electronic mail message.

7. The computer implemented method of claim 1 further comprising:
   mining the at least one of the historical user data and the remote data source for selected data; and
   deriving optimal electric vehicle operation characteristics for achieving the set of optimization objectives while the electric vehicle is being driven.

8. The computer implemented method of claim 7, wherein the optimal electric vehicle operation characteristics comprise minimization of non-electric propulsion.

9. The computer implemented method of claim 1, wherein the notification comprises recommended instructions about how to operate the electric vehicle to achieve the set of optimization objectives.

10. The computer implemented method of claim 9 further comprising:
    presenting the notification responsive to the electric vehicle not being operated as recommended in the recommended instructions, wherein the notification comprises an alert configured to inform a user that the electric vehicle is not being operated as recommended.

11. A computer program product for managing transaction notifications of an electric vehicle charging process, the computer program product comprising:
    a computer recordable-type medium;
    first program instructions for receiving charging process data, wherein the charging process data is stored in a data repository and associated with a user to form historical user data; second program instructions for generating the notification in response to detecting a condition for triggering the generation of the notification, wherein the notification comprises a set of recommendations for achieving a set of optimization objectives, and wherein the set of recommendations are derived from at least one of the historical user data and a remote data source;
    third program instructions for presenting the notification to a user using a set of notification preferences; and wherein the first program instructions, the second program instructions, and the third program instructions are stored on the computer recordable-type medium.

12. The computer program product of claim 11, wherein the second program instructions further comprises:
   fourth program instructions for mining the at least one of the historical user data and the remote data source for selected data, wherein the selected data is identified from at least one of the set of optimization objectives and the set of notification preferences; and
   fifth program instructions for processing the selected data to form the set of recommendations, wherein the set of recommendations provide instructions for achieving the set of optimization objectives for optimizing energy consumption.

13. The computer program product of claim 11, further comprising:
   seventh program instructions for formatting the notification according to the set of notification preferences.

14. The computer program product of claim 13, wherein the seventh program instructions further comprise:
   program instructions for formatting the notification as an entry in a calendaring application.

15. The computer program product of claim 13, wherein the notification is at least one of an event message to a computer program, a text message, a pager message, and an electronic mail message.

16. An apparatus for managing transaction notifications of an electric vehicle charging process, the apparatus comprising:
   a bus system;
   a memory connected to the bus system, wherein the memory includes computer usable program code; and
   a processing unit connected to the bus system, wherein the processing unit executes the computer usable program code to receive charging process data, wherein the charging process data is stored in a data repository and associated with a user to form historical user data; generate a notification in response to detecting a condition for triggering the generation of the notification, wherein the notification comprises a set of recommendations for achieving a set of optimization objectives, and wherein the set of recommendations are derived from at least one of the historical user data and a remote data source; and present the notification to a user using a set of notification preferences.

17. The apparatus of claim 16, wherein the processing unit executes the computer usable program code to mine the at least one of the historical user data and the remote data source for selected data, wherein the selected data is identified from at least one of the set of optimization objectives and the set of notification preferences; and process the selected data to form the set of recommendations, wherein the set of recommendations provide instructions for achieving the set of optimization objectives for optimizing energy consumption.

18. The apparatus of claim 17, wherein the processing unit executes the computer usable program code to present the notification to a user on a notification device, wherein the notification device comprises at least one of a smart phone, a computer, and a display device of an electric vehicle.

19. The apparatus of claim 16, wherein the processing unit executes the computer usable program code to format the notification according to the set of notification preferences.

20. A system for managing transaction notifications of an electric vehicle charging process, the system comprising:
   a charging station, wherein the charging station exchanges electricity with the electric vehicle in the electric vehicle charging process, and wherein the electric vehicle charging process generates charging process data;
   an energy transaction execution engine, wherein the energy transaction execution engine controls an execution of the charging process; and
   an energy transaction notification service, wherein the energy transaction notification service receives the charging process data, wherein the charging process data is associated with a user to form historical user data, and wherein the energy transaction notification service generates a notification in response to detecting a condition for triggering the generation of the notification, wherein the notification comprises a set of recommendations for achieving a set of optimization objectives, and wherein the set of recommendations are derived from at least one of the historical user data and a remote data source, and wherein the notification service presents the notification to the user using a set of notification preferences selected by the user.

* * * * *